United States Patent [19]

Moran et al.

[11] 4,305,964

[45] Dec. 15, 1981

[54] FOOD PRODUCT

[75] Inventors: David P. J. Moran, Covington; Peter W. Halstead, Tewin, both of England

[73] Assignee: Lever Brothers Company, New York, N.Y.

[21] Appl. No.: 95,121

[22] Filed: Nov. 16, 1979

[30] Foreign Application Priority Data

Nov. 16, 1979 [GB] United Kingdom ............... 44798/78

[51] Int. Cl.³ .................. A23C 11/02; A23L 1/19; A23L 1/04
[52] U.S. Cl. .................................. 426/99; 426/570; 426/573; 426/575; 426/576
[58] Field of Search ............. 426/573, 570, 601, 603, 426/604, 657, 99, 89, 103, 575, 576

[56] References Cited

U.S. PATENT DOCUMENTS

| | | | |
|---|---|---|---|
| 3,023,104 | 2/1962 | Battista | 426/573 X |
| 3,343,966 | 9/1967 | Loewenstein | 426/603 X |
| 3,793,464 | 2/1974 | Rusch | 426/99 X |
| 3,856,699 | 12/1974 | Miyano et al. | 426/99 X |
| 4,103,037 | 7/1978 | Bodor et al. | 426/657 X |

FOREIGN PATENT DOCUMENTS

| | | | |
|---|---|---|---|
| 47-14903 | 5/1972 | Japan | 426/573 |
| 48-16183 | 5/1973 | Japan | 426/573 |
| 54-29571 | 9/1979 | Japan | 426/573 |
| 1428105 | 3/1976 | United Kingdom | 426/573 |

*Primary Examiner*—Robert A. Yoncoskie
*Attorney, Agent, or Firm*—James J. Farrell; Melvin H. Kurtz

[57] ABSTRACT

The invention provides food products comprising a continuous aqueous phase and a dispersed gelled aqueous phase. The dispersed phase is preferably made up of gelled water beads of average diameter of 5–10 microns, which beads can, if desired, be coated with a layer of oil. The gelled water beads can contain hydrocolloids, e.g. locust bean gum.

7 Claims, No Drawings

FOOD PRODUCT

The present invention relates to food products, to be used for instance as artificial cream, coffee whitener, whipped cream e.g. for the topping of bakery products, etc., as well as a substitute for double cream for filling cakes etc., and to a process for their preparation.

The invention is based upon the observation that natural cream, being a dispersion of small droplets of oil in water, undergoes little alteration in appearance after it has been chewed.

The food product of the present invention comprises a continuous liquid aqueous phase and a dispersed gelled aqueous phase. The gel strength of the dispersed gelled aqueous phase preferably ranges from 6 to 30 $N/cm^2$ as measured by the Instron apparatus, using it in the liniar compression test mode at room temperature (about 20° C.). Preferably the particles of the dispersed aqueous phase are coated with lipophilic material, e.g. phospholipides and/or edible triglyceride fat.

In the preferred embodiment of the invention a dispersed, water-in-oil emulsion in a continuous liquid aqueous phase is obtained, the dispersed emulsion containing gelled water particles.

Preferably the dispersed aqueous phase comprises gelled water beads of an average diameter of about 5 to 10 microns, when used as a cream substitute or to give a creamy impression to water-continuous food products such as soups; much bigger beads e.g. up to 100 microns can be used when the food product of the invention is intended for e.g. desserts. When about 40% v/v or more of gelled beads are dispersed in an aqueous phase it may be advantageous to use beads of a controlled but variable particle size e.g. in a range varying from 5 up to 100 microns in order to control the rheological properties. A great advantage of the emulsions of the present invention is that organoleptically no or only little difference can be observed between dispersed droplets in natural cream on the one hand and the dispersed gelled water beads in the food product of the invention on the other hand. The invention therefore allows the preparation of low calorie products of a creamy mouth-feel very similar to that of conventional products of higher calorie content. Particularly gelled water beads are used that have been obtained by pouring a hot aqueous gel solution into a triglyceride oil and cooling and stirring the mass so obtained. The gelled water beads can be acid which, in case a proteinaceous liquid-continuous aqueous phase is used, can have the advantage that thereby the beads become coated with an emulsion stabilizing layer of proteins. Alternatively neutral beads can be coated with lipoproteins or other stabilizing agents before dispersing them in the continuous liquid aqueous phase.

Suitably the water beads contain hydrocolloids, e.g. locust bean gum, agar-agar, carrageenan, etc. In a typical emulsion type food product the oil content may vary from about 1 to 20% by weight, the gelled aqueous phase from about 50 to 60% and the continuous liquid aqueous phase from about 40 to 94% by weight of the emulsion.

Preferably the water beads are prepared from a combination of a gelled core surrounded by a different gelled coacervate membrane. Typical of this would be e.g. an agar core, surrounded by a gelatin/gum arabic coacervate membrane, which membrane confers hydrophobic properties to the surface of the beadlet. Similarly beads of protein including starch either as such or surrounded by a coacervate membrane can be used in the food product of the invention.

Preferably the continuous aqueous phase contains proteins and can for instance consist of skim-milk, buttermilk, etc. Emulsifiers, e.g. phosphatides, can be added if desired, essentially depending on the phospholipid content of the continuous aqueous phase.

In one preferred process for preparing such food products, a hot aqueous solution of gellable material is poured into a triglyceride oil, the gellable material is set, e.g. by cooling and stirring the mass thus obtained, so as to obtain gelled water beads suspended in oil, after which the gelled beads are separated from the excess of the oil and dispersed, optionally together with oil, in the liquid aqueous phase.

Alternatively such food products can be prepared by causing a phase inversion of the original gelled beads in oil by adding additional water containing a suitable emulsifier of a high HLB value (e.g. 12 or more) and mildly stirring the mixture to effect phase inversion. In this alternative way the beads are to a lesser extent subjected to mechanical handling and therefore the emulsions obtained are generally more homogeneous in nature.

In case the gellable material is composed of or contains coacervates of gelatin and polysaccharides, the coacervate gel should first be formed by suitably adjusting the pH and temperature to separate the gel from excess water, optionally discarding this water before dispersing the coacervate gel in the triglyceride oil.

The subsequent steps can be the same as those previously described.

In this specification the term "oil" is used both for edible triglyceride mixtures that are liquid and those that are solid at ambient temperature, and normally are indicated as "fats". Examples include e.g. coconut oil, cottonseed oil, rapeseed oil, groundnut oil, linseed oil, maize oil, palm oil, safflower oil, soybean oil, sunflower oil, fish oil, etc.

EXAMPLE I

A low calorie coffee-cream was prepared from the following ingredients:

|  | % |
| --- | --- |
| Gelled water beads | 25.0 |
| Oil associated with beads | 4.0 |
| Free oil | 6.0 |
| Phospholipids | 0.4 |
| Agar | 0.2 |
| Lactose | 2.0 |
| Buttermilk protein | 3.0 |
| Water | 59.4 |

The product was prepared as follows:

A solution of 1.5% agar in water was prepared which was heated whilst stirring to 95° C.

The mass obtained was cooled to 70° C. and poured into groundnut oil of 40°–45° C. whilst stirring.

The mix was homogenised for reducing the particle size of the gelled aqueous phase to particles of a diameter of 5–10 microns and cooled to ambient temperature.

The gelled beads and the adhering oil were separated by filtration from the oil, stirred in water to remove the excess of the oil and dispersed in a liquid aqueous phase consisting of buttermilk, to which 0.2% of soyabean lecithin was added.

EXAMPLE II

Example I was repeated except that the following ingredients were used:

| | % |
|---|---|
| Gelled water beads | 50 |
| Oil associated with beads | 7 |
| Free oil | 10 |
| Phospholipids | 0.4 |
| Agar + locust bean gum + sodium alginate (weight ratio 5:2.5:1) | 0.7 |
| Protein from skim-milk | 1.5 |
| Water | balance |

We claim:

1. An artificial cream-type food product with a continuous liquid aqueous phase comprising 1–20% by weight of a dispersed oil phase, 5–60% by weight of gelled water beads having a gel strength ranging from 6 to 30 N/cm$^2$ as measured by an Instron apparatus in the linear compression test mode, and a particle size ranging from 5 to 100 microns and 40–94% by weight of a continuous liquid aqueous phase.

2. Food product according to claim 1 in which the gelled water beads have an average diameter ranging from 5 to 10 microns.

3. Food product according to claim 1 in which the gelled water beads are coated with a lipophilic material.

4. Food product according to claim 3 in which the lipophilic material consists of a triglyceride oil.

5. Food product according to claim 1 in which the gelled water beads contain a hydrocolloid.

6. A process for producing an artificial cream-type food product with a continuous liquid aqueous phase, comprising:
   (1) preparing gelled beads by
      (i) producing a gellable solution at a temperature at which said solution is fluid, from water and an amount of a gel-producing material sufficient to obtain a gel after setting, said gel having a gel strength ranging from 6 to 30 N/cm$^2$ as measured by an Instron apparatus in the linear compression test mode;
      (ii) pouring said fluid gellable solution into a triglyceride oil;
      (iii) cooling said gellable solution suspended in oil to a temperature sufficient to allow the gellable material to set; and
      (iv) during the step of setting or prior to setting, stirring the gellable solution to produce gelled water beads with a particle size ranging from 5 to 100 microns, suspended in oil;
      (v) separating the gelled beads from the excess of oil to obtain gelled beads coated with oil;
   (2) dispersing the oil-coated gelled beads in an aqueous phase to yield said product comprising 1–20% by weight of dispersed oil, 5–60% by weight of gelled water beads and 40–94% by weight of a continuous liquid aqueous phase.

7. A process for producing an artificial cream-type food product with a continuous liquid aqueous phase, comprising:
   (i) producing a gellable solution at a temperature at which said solution is fluid, from water and an amount of a gel producing material sufficient to obtain a gel after setting, said gel having a gel strength ranging from 6 to 30 N/cm$^2$ as measured by an Instron apparatus in the linear compression test mode;
   (ii) pouring said fluid gellable solution into a triglyceride oil;
   (iii) cooling said gellable solution suspended in oil to a temperature sufficient to allow the gellable material to set;
   (iv) stirring the gellable solution during the step of setting or prior to setting to produce gelled water beads with a particle size ranging from 5 to 100 microns suspended in oil;
   (v) achieving phase inversion of the gelled material suspended in oil by adding an appropriate amount of water containing an emulsifier having an HLB value of at least 12 to yield said product comprising 1–20% by weight of dispersed oil, 5–60% by weight of gelled water beads and 40–94% by weight of a continuous liquid aqueous phase.

* * * * *